United States Patent
Kawata

(10) Patent No.: US 6,952,243 B2
(45) Date of Patent: Oct. 4, 2005

(54) ELECTRO-OPTICAL APPARATUS AND ELECTRONIC EQUIPMENT

(75) Inventor: Hidenori Kawata, Chino (JP)

(73) Assignee: Seiko Epson Corporation, Tokyo (JP)

( * ) Notice: Subject to any disclaimer, the term of this patent is extended or adjusted under 35 U.S.C. 154(b) by 20 days.

(21) Appl. No.: 10/614,918

(22) Filed: Jul. 9, 2003

(65) Prior Publication Data

US 2004/0085497 A1 May 6, 2004

(30) Foreign Application Priority Data

Jul. 11, 2002 (JP) .......................................... 2002-203001

(51) Int. Cl.[7] .................................................. G02F 1/13
(52) U.S. Cl. .......................................... 349/39; 349/44
(58) Field of Search ............................. 349/39, 44, 113

(56) References Cited

U.S. PATENT DOCUMENTS 6,034,749 A * 3/2000 Sato et al. ..................... 349/47
6,636,284 B2 * 10/2003 Sato ............................ 349/110
6,665,024 B2 * 12/2003 Kurashina ..................... 349/39
6,768,522 B2 * 7/2004 Yasukawa et al. ............. 349/43

* cited by examiner

Primary Examiner—James A. Dudek
(74) Attorney, Agent, or Firm—Oliff & Berridge, PLC

(57) ABSTRACT

An electro-optical apparatus is provided with a pixel electrode, a TFT connected thereto, and a scanning line and a data line connected thereto above a TFT array substrate. Furthermore, a junction layer, which performs the function of a pixel-potential-side capacitor electrode of a storage capacitor, and a capacitor line including a fixed-potential-side capacitor electrode arranged to face this with a dielectric film therebetween, are provided. A multilayer junction-layer connecting the junction layer and the pixel electrode is provided from the same multilayer film as the data line, while covering a notch portion of the capacitor line. The upper film of this multilayer film is made of a material unlikely to be subject to electrolytic corrosion by ITO of the pixel electrode compared with that in the lower film.

15 Claims, 9 Drawing Sheets

ELECTRO-OPTICAL APPARATUS AND ELECTRONIC EQUIPMENT

BACKGROUND OF THE INVENTION

1. Field of Invention

The present invention relates to electro-optical apparatuses, e.g., liquid crystal devices of an active matrix addressing system, and electronic equipment provided with the electro-optical apparatus. In particular, the invention relates to an electro-optical apparatus having a form in which a thin film transistor (hereafter "TFT") to provide pixel switching is provided in a laminated structure on a substrate.

2. Description of Related Art

In a related art electro-optical apparatus of a TFT active matrix addressing system, when incident light is applied to the channel region of the TFT to provide pixel switching provided on a pixel basis, optical leakage current is generated resulting from excitation by the light, and therefore characteristics of the TFT are changed. In particular, in the electro-optical apparatus for a light valve of a projector, since the intensity of the incident light is high, it is important to cut off the light incident into the channel region of the TFT and the peripheral region thereof. Therefore, in the related art configuration, such a channel region and peripheral regions thereof are shielded from light by a light-shielding film which specify the opening region of each pixel provided on the facing-substrate or by a data line which passes above the TFT on a TFT array substrate and which is composed of a metal film, e.g., Al (aluminum). Furthermore, a light-shielding film made of, e.g., a high-melting-point metal, is sometimes provided in the location facing the lower side of the TFT on the TFT array substrate as well. When a light-shielding film is also provided under the TFT, in the case where an optical system is constructed by combining the reverse-surface-reflected light from the TFT array substrate side and a plurality of electro-optical apparatuses through a prism and the like, the returned light of, e.g., projected light from another electro-optical apparatus, penetrating the prism and the like, can be reduced or prevented from entering into the TFT of the electro-optical apparatus, before it happens.

On the other hand, regarding this type of related art electro-optical apparatus, in order that when the TFT is brought into conduction, the voltage of the image signal applied to the pixel electrode therethrough is kept for a time much longer than the time in which the TFT is conducting, for example, a technology of constructing a storage capacitor composed of a pixel-potential-side capacitor electrode connected to a drain electrode of the TFT or a pixel electrode and a fixed-potential-side capacitor electrode arranged facing this with a dielectric film therebetween into each pixel.

However, when the storage capacitor is constructed in the laminated structure on the substrate, in general, it becomes necessary to connect the pixel-potential-side capacitor electrode and the pixel electrode or the TFT via a contact hole provided in the laminated structure. Consequently, a light-shielding film, data line or the like arranged between the TFT and the pixel electrode connected via the contact hole is formed negotiating around the contact hole, and thereby a problem occurs in that the lightproof performance is degraded at the contact hole and the periphery thereof. That is, the incident light entering into the contact hole and the periphery thereof is not cut off by a light-shielding film, data line or the like, and reaches the channel region of the TFT and the peripheral region thereof. Consequently, the characteristics of the TFT is changed or degraded so as to cause a problem of a flicker and the like.

SUMMARY OF THE INVENTION

The present invention addresses the above and/or other problems, and provides an electro-optical apparatus, which has excellent light resistance and which can perform high-quality image display, and electronic equipment provided with this electro-optical apparatus.

In order to address or overcome the above, an electro-optical apparatus of the present invention includes a pixel electrode provided above a substrate, a thin film transistor to perform switching control of the pixel electrode, and a data line which is provided on the upper layer side of the thin film transistor and which supplies an image signal to the pixel electrode via the thin film transistor. Furthermore, a pixel-potential-side capacitor electrode of a storage capacitor, which is provided on the upper layer side of the thin film transistor and which is electrically connected between the thin film transistor and the pixel electrode, and a capacitor line including a fixed-potential-side capacitor electrode, which is provided on the upper layer side of the pixel-potential-side capacitor electrode while facing this with a dielectric film therebetween and which is provided with a notch portion corresponding to a connection region for connecting the pixel-potential-side capacitor electrode and the pixel electrode, are included. The pixel-potential-side capacitor electrode is composed of a first conductive transparent film, the capacitor line is composed of a first conductive light-shielding film, the data line is composed of a second conductive light-shielding film, and the pixel electrode is composed of a second conductive transparent film. Furthermore, a multilayer junction-layer which is transit-connected between the pixel-potential-side capacitor electrode and the pixel electrode, which has a laminated structure including a first layer composed of the second light-shielding film and a conductive second layer having chemical stability against the second transparent film higher than that of the second light-shielding film, laminated on the upper layer side of the first layer, and which is in the shape of a plane covering the notch portion in plan view is provided in the connection region.

According to the electro-optical apparatus of the present invention, for example, when an image signal is supplied to the thin film transistor via the data line while a scanning signal is supplied to a gate of the thin film transistor via a scanning line, active matrix addressing of the pixel electrode can be performed by the switching control of the thin film transistor. Since the storage capacitor, in which the pixel-potential-side capacitor electrode and the fixed-potential-side capacitor electrode are arranged while facing each other, is connected to the pixel electrode, the voltage of the image signal written in the pixel electrode can be kept for the long term. Each of the pixel-potential-side capacitor electrode and the pixel electrode is composed of a transparent film, whereas each of the capacitor line and the data line is composed of a light-shielding film. Consequently, leakage of light in an unopened region of each pixel electrode can be reduced or basically prevented by the presence of them. However, a notch portion is provided in the capacitor line composed of the light-shielding film in the connection region to connect the pixel-potential-side capacitor electrode and the pixel electrode to each other. Therefore, when the connection region is left unchanged, leakage of light may occur, so that the light may be incident into the channel region of the thin film transistor and the region adjacent thereto. On the other hand, in the present invention, a multilayer junction-layer which is transit-connected between the pixel-potential-side capacitor electrode and the pixel electrode and which includes two light-shielding films is further provided in the connection region, so that this covers the notch portion, and thereby, the leakage of light in the connection region can be reduced or efficiently prevented. Consequently, it can be reduced or effectively prevented that changes in the characteristics of the thin film transistor cause a flicker and the like, before it happens. The multilayer junction-layer is, e.g., a rectangular island-shaped piece of light-shielding film covering the rectangular connection region in plan view, and the first layer thereof is separated from the data line.

In particular, the multilayer junction-layer has a laminated structure including the first layer composed of the second light-shielding film in a manner similar to that in the data line and a conductive second layer having chemical stability against the second transparent film constituting the pixel electrode higher than that of this second light-shielding film. Consequently, for example, even in the case where selected materials cause poor chemical stability and electrolytic corrosion when the second light-shielding film and the second transparent film are brought into direct contact, as in the case where the data line as the second light-shielding film is formed from a low-resistance Al film and the pixel electrode as the second transparent film is formed from an ITO film, such electrolytic corrosion can be reduced or effectively prevented by forming the second layer in the multilayer junction-layer from a material, e.g., titanium nitride, of Ti (titanium) base, W (tungsten) base or the like having excellent chemical stability against the second transparent film. In addition, since the first layer constituting the multilayer junction-layer is composed of the second light-shielding film in the same manner as that in the data line, both the first layer and the data line can be simultaneously formed in the same step from the same film, that is, the second light-shielding film, by patterning. In this manner, complication of the laminated structure on the substrate and the manufacturing process can be avoided.

In the present invention, "the first light-shielding film" and "the second light-shielding film" refer to that the light incident into the electro-optical apparatus can be cut off to the extent of doing substantially no harm to the thin film transistor, and refer to include a light-shielding film which transmits a minuscule or small amount of light compared with the amount of light cut off. Conversely, in the present invention, "the first transparent film" and "the second transparent film" refer to that the light incident into the electro-optical apparatus can be transmitted to the extent of being usable for display, and refer to include a transparent film or a translucent film which cuts off a minuscule or small amount of light compared with the amount of light transmitted.

As a result, according to the electro-optical apparatus of the present invention, the light resistance can be efficiently enhanced by relatively simple configuration, and therefore, high-quality image display can be performed.

In one aspect of the electro-optical apparatus of the present invention, the multilayer junction-layer is larger than the notch portion in plan view.

According to this aspect, the leakage of light in the vicinity of the notch portion, that is, the connection region, can be more reliably prevented by the multilayer junction-layer larger than the notch portion. In particular, when the multilayer junction-layer is formed to have a contour larger than that of the notch portion in every direction in plan view, that is, a size larger contour, the leakage of light is reliably reduced or prevented. Furthermore, when slantingly incident light is present, light shielding can also be reliably performed by the multilayer junction-layer larger than the notch portion. At this time, the extent to which the multilayer junction-layer is formed larger than the notch portion may be individually, specifically determined in order that the slantingly incident light can be cut off in consideration of the angle of the slantingly incident light, the light intensity, patterning precision of each layer or the like with the provision that the aperture region of each pixel is not significantly reduced.

In another aspect of the electro-optical apparatus of the present invention, the data line has the same laminated structure as that of the multilayer junction-layer.

According to this aspect, the data line has the laminated structure including a first layer and a second layer in a manner similar to that in the multilayer junction-layer. Consequently, in the manufacture thereof, both the data line and the multilayer junction-layer can be simultaneously formed in the same step. That is, when the multilayer film including the first layer and the second layer is formed, and thereafter, patterning is performed, the data line and the multilayer junction-layer can be simultaneously formed by patterning once. In this manner, complication of the laminated structure on the substrate and the manufacturing process can be avoided.

In another aspect of the electro-optical apparatus of the present invention, a first interlayer insulating film is laminated between the thin film transistor and the first transparent film, a second interlayer insulating film is laminated between the first light-shielding film and the second light-shielding film, and a third interlayer insulating film is laminated between the second light-shielding film and the second transparent film. The thin film transistor and the pixel-potential-side capacitor electrode are electrically connected via a first contact hole provided in the first interlayer insulating film. The pixel-potential-side capacitor electrode and the multilayer junction-layer are electrically connected via a second contact hole provided in the second interlayer insulating film, and the multilayer junction-layer and the pixel electrode are electrically connected via a third contact hole provided in the third interlayer insulating film.

According to this aspect, the pixel-potential-side capacitor electrode and the pixel electrode are transit-connected by the multilayer junction-layer arranged between the second and the third interlayer insulating films via the second and the third contact holes. At this time, since the second contact hole is arranged in the notch portion of the first light-shielding film, the light-shielding function of the first light-shielding film is lowered in this portion. However, the light-shielding performance in this portion can be sufficiently complemented by the multilayer junction-layer covering the notch portion.

In this aspect, the third contact hole may be provided extending in the second contact hole, and the first transparent film, the multilayer junction-layer and the second transparent film may be directly laminated in the second contact hole.

By this configuration, the pixel-potential-side capacitor electrode and the pixel electrode can be reliably transit-connected using the multilayer junction-layer even in a relatively small connection region.

Furthermore, in this configuration, the second contact hole and the third contact hole may be coaxially provided.

By this configuration, a region above the substrate occupied by the connection region can be reduced because the transit connection is performed by the multilayer junction-layer via the second and the third contact holes which are coaxially provided in the structure.

In another aspect of the electro-optical apparatus of the present invention, the second transparent film is composed of ITO (Indium Tin Oxide), the first layer is composed of Al (aluminum), and the second layer is composed of a simple metal, an alloy or a metal silicide, or a metal nitride film, which contains a high-melting-point metal.

According to this aspect, the second layer unlikely to cause electrolytic corrosion even when being brought into contact with ITO, in contrast to that in Al, can be formed from a simple metal, an alloy or metal silicide, or a metal nitride film, which contains a high-melting-point metal. Examples of high-melting-point metals include, for example, Ti (titanium), Cr (chromium), W (tungsten), Ta (tantalum), Mo (molybdenum) and Pd (palladium). In particular, since it is verified that electrolytic corrosion occurs when the second transparent film composed of ITO and the first layer composed of Al are brought into direct contact, the use of the multilayer junction-layer, as described above, is very advantageous in practice. Furthermore, since it is difficult to simultaneously achieve the light-shielding performance and the electric conductivity required in the connection region by a junction layer having a monolayer structure, the achievement of the required light-shielding performance and electric conductivity by the combination of the first layer and the second layer through the use of the multilayer structure, as described above, is very advantageous.

Preferably, the second layer laminated on the above-mentioned first layer composed of Al is formed at a temperature lower than the melting temperature of Al. Preferably, the formation is performed by a low-temperature treatment, e.g., sputtering and CVD (Chemical Vapor Deposition).

In another aspect of the first electro-optical apparatus of the present invention, the second layer has an OD (Optical Density) value of 2.0 or more, and preferably, 4.0 or more.

According to this aspect, the light-shielding performance in the connection region can be improved to a practically sufficient level.

In order to address or overcome the above-mentioned problems, another electro-optical apparatus of the present invention includes a pixel electrode provided above a substrate, a thin film transistor to perform switching control of the pixel electrode, and a data line which is provided on the upper layer side of the thin film transistor and which supplies an image signal to the pixel electrode via the thin film transistor. Furthermore, a pixel-potential-side capacitor electrode of a storage capacitor, which is provided on the upper layer side of the thin film transistor and which is electrically connected between the thin film transistor and the pixel electrode, and a capacitor line including a fixed-potential-side capacitor electrode, which is provided on the upper layer side of the pixel-potential-side capacitor electrode while facing this with a dielectric film therebetween and which is provided with a notch portion corresponding to a connection region to connect the pixel-potential-side capacitor electrode and the pixel electrode, are included. The pixel-potential-side capacitor electrode is composed of a first conductive transparent film, the capacitor line is composed of a first conductive light-shielding film, the data line is composed of a second conductive light-shielding film, and the pixel electrode is composed of a second conductive transparent film. Furthermore, a monolayer junction-layer which is transit-connected between the pixel-potential-side capacitor electrode and the pixel electrode, which is composed of the second light-shielding film, and which is in the shape of a plane covering the notch portion in plan view is provided in the connection region.

According to the second electro-optical apparatus of the present invention, each of the pixel-potential-side capacitor electrode and the pixel electrode is composed of a transparent film, whereas each of the capacitor line and the data line is composed of a light-shielding film. Consequently, leakage of light in an unopened region of each pixel electrode can be reduced or basically prevented by the presence of them.

However, a notch portion is provided in the capacitor line composed of the light-shielding film in the connection region to connect the pixel-potential-side capacitor electrode and the pixel electrode to each other. Therefore, when the connection region is left unchanged, leakage of light may occur, so that the light may be incident into the channel region of the thin film transistor and the region adjacent thereto. On the other hand, in the present invention, a monolayer junction-layer which is transit-connected between the pixel-potential-side capacitor electrode and the pixel electrode and which is composed of the second light-shielding film is further provided, so that this covers the notch portion, and therefore the leakage of light in the connection region can be reduced or efficiently prevented. Consequently, it can be reduced or effectively prevented that changes in the characteristics of the thin film transistor cause a flicker and the like, before it happens. The monolayer junction-layer is, e.g., a rectangular island-shaped piece of light-shielding film covering the rectangular connection region in plan view, and it is separated from the data line. In particular, the monolayer junction-layer is composed of the same second light-shielding film as that in the data line. Consequently, electrolytic corrosion in the monolayer junction-layer can be reduced or effectively prevented by forming them from a material of, e.g., W (tungsten) base, Ti (titanium) base or the like, having excellent chemical stability against the second transparent film composed of, e.g., ITO. In addition, since the monolayer junction-layer is composed of the same second light-shielding film as that in the data line, both the monolayer junction-layer and the data line can be simultaneously formed in the same step from the same film, that is, the second light-shielding film, by patterning. In this manner, complication of the laminated structure on the substrate and the manufacturing process can be avoided.

As a result, according to the electro-optical apparatus of the present invention, the light resistance can be efficiently enhanced by relatively simple configuration, and therefore, high-quality image display can be performed.

In one aspect of the second electro-optical apparatus of the present invention, the second transparent film is composed of ITO, and the second light-shielding film is composed of a simple metal, an alloy or a metal silicide, or a metal nitride film, which contains a high-melting-point metal.

According to this aspect, the second light-shielding film unlikely to cause electrolytic corrosion even when being brought into contact with, e.g., ITO, in contrast to that in Al, can be formed from a simple metal, an alloy or metal silicide, or a metal nitride film, which contains a high-melting-point metal. Since it is verified that electrolytic corrosion occurs when the second transparent film composed of ITO and Al are brought into direct contact, the use of the above-mentioned second light-shielding film containing a high-melting-point metal as a junction layer is very advantageous in practice.

In another aspect of the first or the second electro-optical apparatus of the present invention, a facing-substrate facing the substrate and an electro-optical material layer held between the substrate and the facing-substrate are further included.

According to this aspect, an electro-optical apparatus, e.g., liquid crystal device, can be realized in which the electro-optical material layer is held between a pair of the substrate and the facing-substrate.

In order to address or overcome the above-mentioned problems, electronic equipment of the present invention is provided with the above-mentioned electro-optical apparatus (where various aspects thereof are included) of the present invention.

According to the electronic equipment of the present invention, since the above-mentioned first or second electro-optical apparatus of the present invention is provided in the configuration, unevenness in pixels and a flicker are reduced. Consequently, various types of electronic equipment, e.g., projectors, liquid crystal televisions, cellular phones, electronic notepads, word processors, viewfinder type and monitor-direct-view type videotape recorders, work stations, videophones, POS terminals and touch panels, for example, having excellent display quality can be realized.

The above-mentioned operations and other advantages of the present invention will become apparent from the following description of the exemplary embodiments.

DETAILED DESCRIPTION OF PREFERRED EMBODIMENTS

Exemplary embodiments of the present invention are described below with reference to drawings. In the following exemplary embodiments, electro-optical apparatuses of the present invention are applied to liquid crystal devices.

First Exemplary Embodiment

Figure 1:
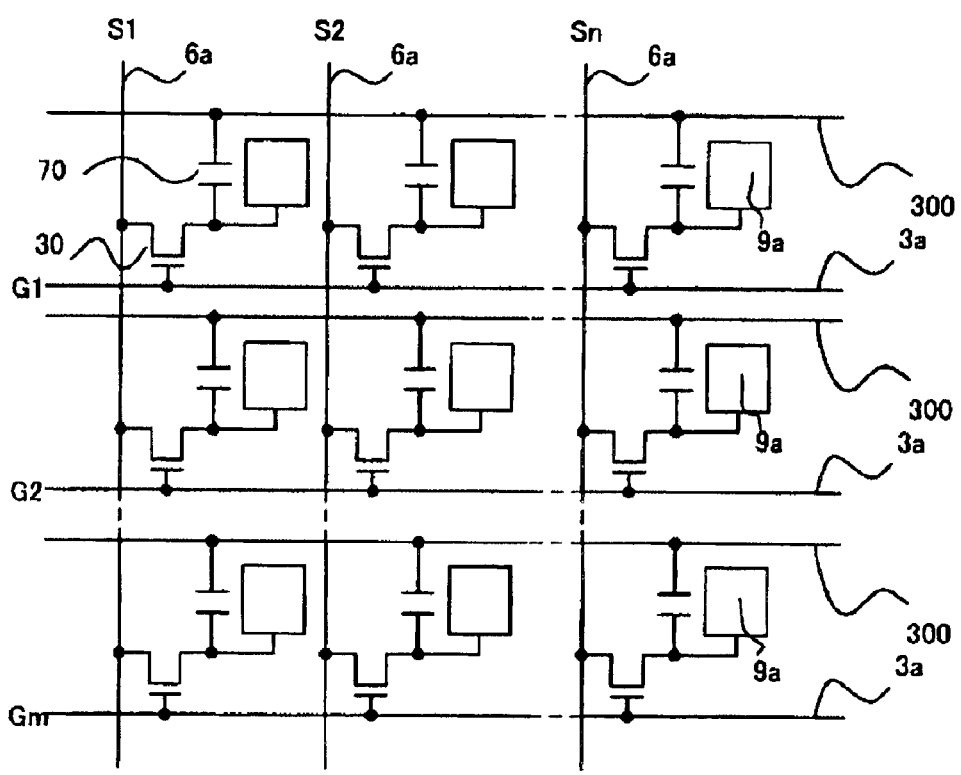
FIG. 1 is a schematic of an equivalent circuit of various elements, wirings and the like with respect to a plurality of pixels in the matrix constituting an image display region of an electro-optical apparatus according to a first exemplary embodiment of the present invention.
Figure 2:
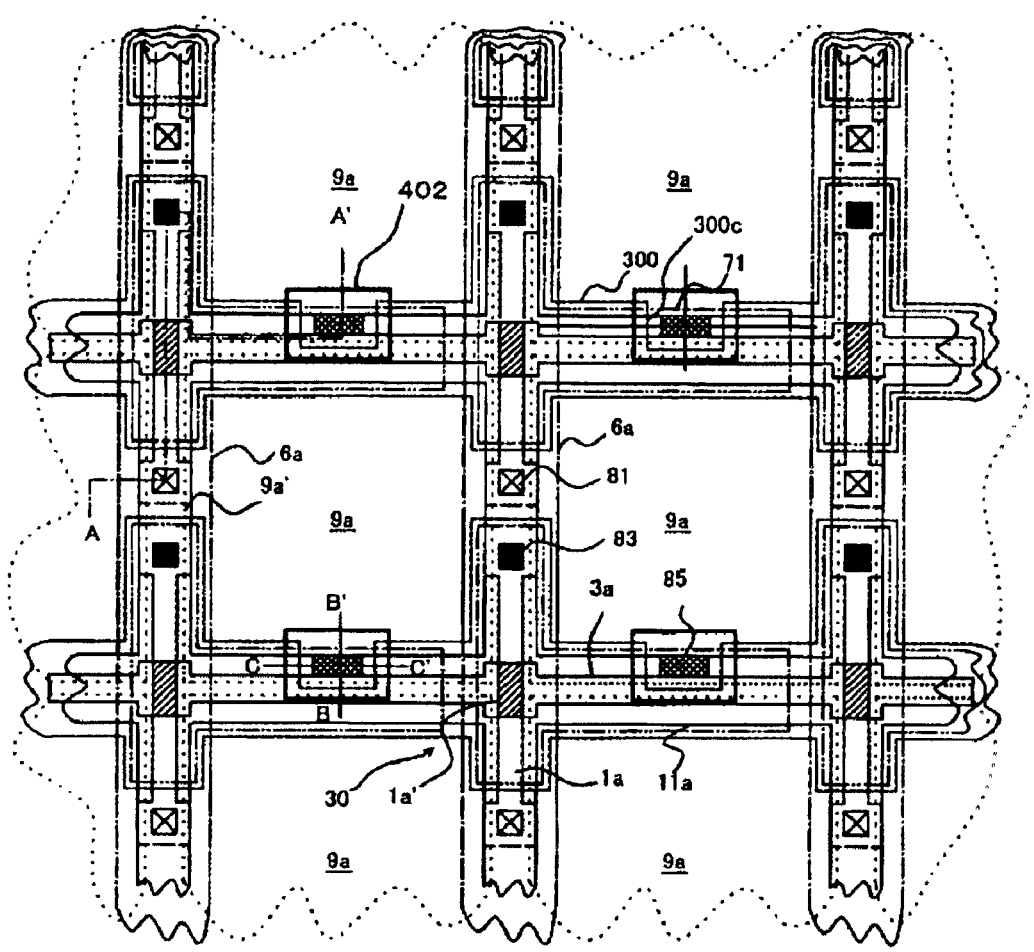
FIG. 2 is a plan view of a plurality of pixel groups adjacent to each other above a TFT array substrate provided with data lines, scanning lines, pixel electrodes and the like in the electro-optical apparatus according to the first exemplary embodiment.
Figure 3:
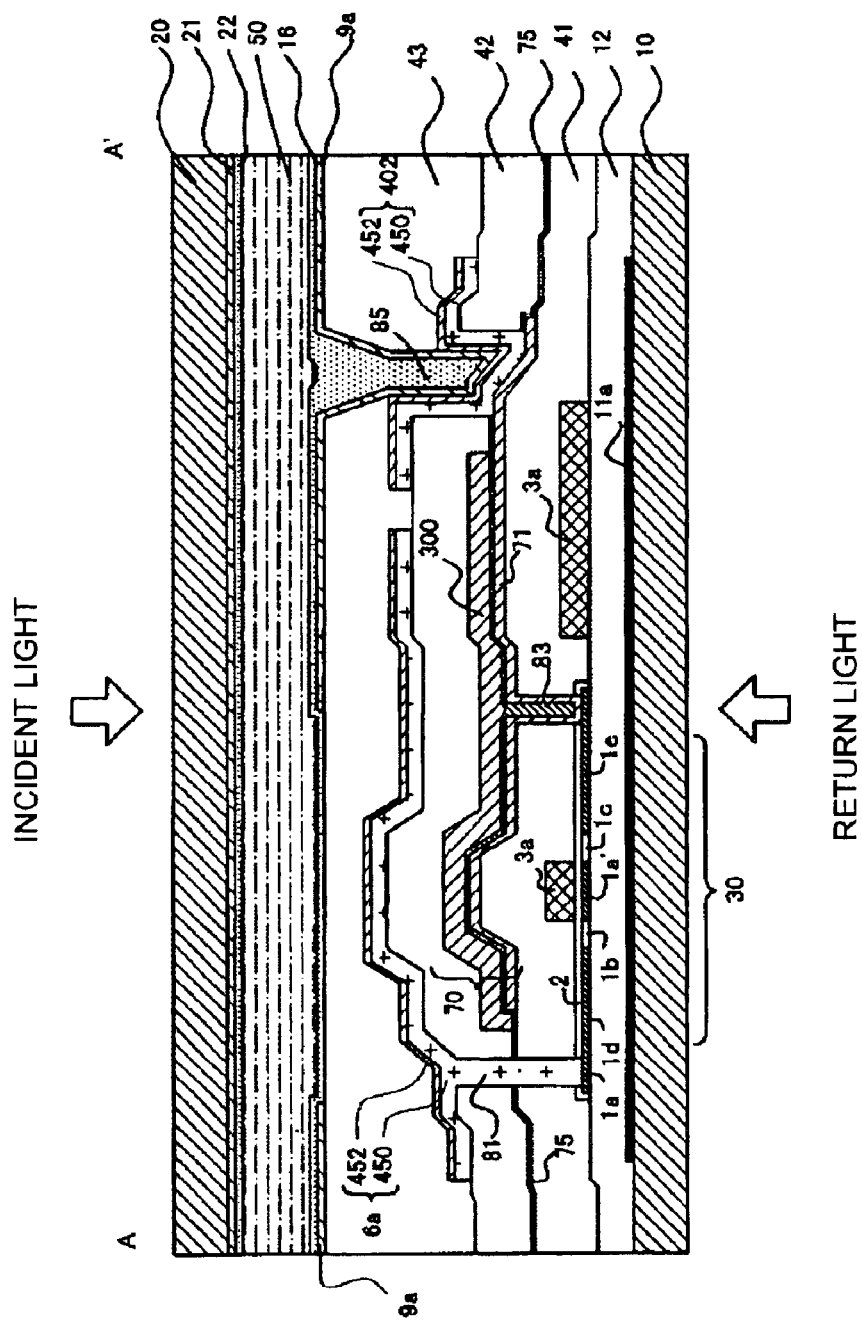
FIG. 3 is a sectional view of the section taken along plane A–A' shown in FIG. 2 according to the first exemplary embodiment.

The configuration of a pixel portion of an electro-optical apparatus in the first exemplary embodiment of the present invention is described below with reference to FIG. 1 to FIG. 3. FIG. 1 is a schematic of an equivalent circuit of various elements, wirings and the like with respect to a plurality of pixels, provided in the matrix, constituting an image display region of an electio-optical apparatus. FIG. 2 is a plan view of a plurality of pixel groups adjacent to each other above a TFT array substrate provided with data lines, scanning lines, pixel electrodes and the like. FIG. 3 is a sectional view of the section taken along plane A–A' shown in FIG. 2. In FIG. 3, the scales are varied on a layer or a member basis in order that each layer or each member has the size capable of being identified in the drawing.

In FIG. 1, a pixel electrode 9a and a TFT 30 to perform switching control of the pixel electrode 9a are provided with respect to each of a plurality of pixels, provided in the matrix, constituting an image display region of an electro-optical apparatus in the present exemplary embodiment, and a data line 6a, to which an image signal is supplied, is electrically connected to the source of the TFT 30. Image signals S1, S2, . . . , Sn to be written in the data lines 6a may be supplied in that order in the manner of line at a time, or be supplied on a group basis to a plurality of data lines 6a adjacent to each other. In the configuration, a scanning line 3a is electrically connected to the gate of the TFT 30, and pulse-like scanning signals G1, G2, . . . , Gm are applied in that order with predetermined timing to the scanning line 3a in the manner of line at a time. The pixel electrode 9a is electrically connected to the drain of the TFT 30, and the image signals S1, S2, . . . , Sn supplied from the data lines 6a are written in with predetermined timing by closing the switch of the TFT 30, as a switching element, for a fixed period of time. The image signals S1, S2, ..., Sn at a predetermined level written in a liquid crystal, as an example of the electro-optical material, via the pixel electrode 9a are kept at a fixed period of time between a counter electrode formed on a facing-substrate described below and the liquid crystal. The liquid crystal modulates the light and makes the grayshade possible because the alignment and the order of the molecule aggregation vary depending on the level of the applied voltage. In normally white mode, the transmittance ratio with respect to the incident light is decreased in accordance with a voltage applied on a pixel basis, and in normally black mode, the transmittance ratio with respect to the incident light is increased in accordance with a voltage applied on a pixel basis. As a whole, the light having a contrast in accordance with the image signal outgoes from the electro-optical apparatus. In order to reduce or prevent leakage of the kept image signal, a storage capacitor 70 is added parallel to a liquid crystal capacitor provided between the pixel electrode 9a and the counter electrode.

FIG. 2, a plurality of transparent pixel electrodes 9a (the contours are indicated by dotted portions 9a') are provided in the matrix above a TFT array substrate of the electro-optical apparatus, and a data line 6a and a scanning line 3a are provided along vertical and horizontal boundaries, respectively, of the pixel electrode 9a.

The scanning line 3a is arranged facing a channel region 1a' indicated by an upwardly, diagonally shaded region in a semiconductor layer 1a shown in FIG. 2, and the scanning line 3a includes a gate electrode. The scanning line 3a is configured to have the wide gate electrode portion facing the channel region 1a'.

In this manner, a TFT 30 for pixel switching, in which a part of the scanning line 3a is arranged as a gate electrode facing the channel region 1a', is provided at each portion where the scanning line 3a and a main track portion 61a of the data line 6a intersect.

A junction layer 71, as a pixel-potential-side capacitor electrode, connected to a high-concentration drain region 1e of the TFT 30 and a pixel electrode 9a and a part of a capacitor line 300, as a fixed-potential-side capacitor electrode, are arranged while facing each other with a dielectric layer 75 therebetween, and therefore, a storage capacitor 70 is provided.

The capacitor line 300 is composed of, e.g., a conductive light-shielding film containing a metal or an alloy, constitutes an example of an upper light-shielding film (built-in light-shielding film), and in addition, performs the function as the fixed-potential-side capacitor electrode. The capacitor line 300 is composed of, for example, a simple metal, an alloy, a metal silicide, polysilicide or a laminate thereof, which contains at least one high-melting-point metal of Ti (titanium), Cr (chromium), W (tungsten), Ta (tantalum), Mo (molybdenum), Pd (palladium) and the like. The capacitor line 300 may contain other metals, e.g., Al (aluminum) and Ag (silver). However, alternatively, the capacitor line 300 may have a multilayer structure in which, for example, a first film composed of a conductive polysilicon film or the like and a second film composed of a metal silicide film containing a high-melting-point metal or the like are laminated.

On the other hand, the junction layer 71 is composed of, e.g., a conductive polysilicon film, and performs the function as a pixel-potential-side capacitor electrode. The junction layer 71 has the function as a light-absorption layer or another example of the upper light-shielding film, in addition to the function as a pixel-potential-side capacitor electrode, and is arranged between the capacitor line 300, as an upper light-shielding film, and the TFT 30. The junction layer 71 further has the function of transit-connecting the pixel electrode 9a to the high-concentration drain region 1e of TFT 30. However, the junction layer 71 may also be composed of a monolayer film or a multilayer film, which contains a metal or an alloy, in a manner similar to that in the capacitor line 300.

In plan view, the capacitor line 300 extends in the stripe along the scanning line 3a, and the portion overlapping the TFT 30 protrudes upward and downward in FIG. 2. Data lines 6a individually extending in the vertical direction in FIG. 2 and capacitor lines 300 individually extending in the horizontal direction in FIG. 2 are formed to intersect, and therefore the upper light-shielding film (built-in light-shielding film) in the shape of a lattice in plan view is constructed on the upper side of the TFT 30 above the TFT array substrate 10 so that the aperture region of each pixel is specified.

A lower light-shielding film 11a is provided in the shape of a lattice under the TFT 30 above the TFT array substrate 10. The lower light-shielding film 11a is composed of, for example, a simple metal, an alloy, a metal silicide, polysilicide or a laminate thereof, which contains at least one high-melting-point metal of Ti, Cr, W, Ta, Mo and the like, in a manner similar to that in the capacitor line 300 constituting an example of the upper light-shielding film, as described above. Alternatively, other metals, e.g., Al and Ag, are contained.

Consequently, in the present exemplary embodiment, the configuration in which the semiconductor layer 1a is held between the lower light-shielding film 11a and the lattice-shaped upper light-shielding film composed of the capacitor line 300, the junction layer 71 and the data line 6a, as described above, can be achieved while the interlayer distance is relatively small, and thereby, basically very high light-shielding performance with respect to the incident light and the returned light can be achieved.

The dielectric film 75 arranged between the junction layer 71, as the capacitor electrode, and the capacitor line 300 is composed of, for example, a silicon oxide film, e.g., an HTO (High Temperature Oxide) film or an LTO (Low Temperature oxide) film, or a silicon nitride film, having a relatively thin film thickness in the order of, e.g., 5 to 200 nm (nanometer).

The capacitor line 300 is provided extending from the image display region, in which the pixel electrode 9a is arranged, to the periphery thereof, and is electrically connected to a constant-potential source so as to become a fixed potential. Such a constant-potential source may be a constant-potential source of a positive power source or a negative power source supplied to a scanning line driving circuit, described below, to supply a scanning signal to the scanning line 3a in order to drive the TFT 30, or supplied to a data line driving circuit, described below, for controlling a sampling circuit in order to supply an image signal to the data line 6a. The constant-potential source may be a constant-potential supplied to a counter electrode 21 of the counter substrate 20. Furthermore, preferably, the lower light-shielding film 11a is provided extending from the image display region to the periphery thereof and is connected to the constant-potential source, in a manner similar to that in the capacitor line 300, in order to reduce or avoid variations in the potential from adversely affecting the TFT 30.

As shown in FIG. 2 and FIG. 3, in particular in the present exemplary embodiment, the pixel electrode 9a is electrically connected to the high-concentration drain region 1e in the semiconductor layer 1a by way of a multilayer junction-layer 402 laminated on a second interlayer insulating film 42 and the junction layer 71 laminated on the first interlayer insulating film 41 via contact holes 85 and 83.

The junction layer 71 has the function of transit-connecting the pixel electrode 9a to the TFT 30, in addition to the function as a pixel-potential-side capacitor electrode of the storage capacitor 70 and the function as the light absorption layer.

The multilayer junction-layer 402 has the same multilayer structure as that of the data line 6a. That is, each of the multilayer junction-layer 402 and the data line 6a has a multilayer structure including, for example, two layers of a first layer 450 of, e.g., Al having excellent conductivity and a second layer 452 composed of, e.g., a material having good electrochemical compatibility with ITO constituting the pixel electrode 9a. Reduction of resistance of the data line 6a and the multilayer junction-layer 402 can be achieved by the presence of the first layer 450 made of Al or the like. At the same time, electrolytic corrosion in the multilayer junction-layer 402 can be reduced or effectively prevented by the presence of the second layer 452 composed of, for example, a material having good electrochemical compatibility with ITO, e.g., a simple metal, an alloy, a metal silicide or a metal nitride film, which contains at least one high-melting-point metal of Ti, Cr, W, Ta, Mo and the like. More specifically, Al is likely to bring about electrolytic corrosion with respect to ITO because the electronegativity of Al is highly negative, and therefore, is active. On the other hand, TiN (titanium nitride), Ti, W, WSi and the like rarely bring about such electrolytic corrosion.

In this manner, through the use of the multilayer junction-layer 402 and the junction layer 71, even when an interlayer distance is in the order of, e.g., a long 2,000 nm, connection between the pixel electrode 9a and the TFT 30 can be excellently performed by the contact hole and the groove while technical difficulty in connection between the two by one contact hole can be reduced or avoided. Consequently, a pixel aperture ratio can be increased, and etching is reduced or effectively prevented from penetrating during formation of the contact hole. In addition, an effect of reducing the contact resistance of the pixel-potential-side capacitor electrode and the pixel electrode is exerted, ON-state current of the transistor is improved by about 50%, and as a result, the contrast can be enhanced.

The light-shielding function of the above-mentioned multilayer junction-layer 402 in the vicinity of the contact hole 85 is described below with reference to FIG. 4 to FIG. 7.

As shown in FIG. 2 and FIG. 3, the electro-optical apparatus is provided with the transparent TFT array substrate 10 and the transparent facing-substrate 20 arranged facing this. The TFT array substrate 10 is composed of, e.g., a quartz substrate, a glass substrate or a silicon substrate, and the facing-substrate 20 is composed of, e.g., a glass substrate or a quartz substrate.

The TFT array substrate 10 is provided with the pixel electrode 9a, and an alignment film 16 subjected to a predetermined alignment treatment, e.g., a rubbing treatment, is provided on the upper side thereof. The pixel electrode 9a is composed of, for example, a transparent conductive film, e.g., an ITO (Indium Tin Oxide) film. The alignment film 16 is composed of, for example, an organic film, e.g., a polyimide film.

On the other hand, the facing-substrate 20 is provided with a counter electrode 21 all over the surface thereof, and an alignment film 22 subjected to a predetermined alignment treatment, e.g., a rubbing treatment, is provided thereunder.

The counter electrode 21 is composed of, for example, a transparent conductive film, e.g., an ITO film. The alignment film 22 is composed of an organic film, e.g., a polyimide film.

The facing-substrate 20 may be provided with a lattice-shaped or stripes-shaped light-shielding film. When such a configuration is adopted, the incident light from the facing-substrate 20 side can be reduced or more reliably prevented from entering into the channel region 1a', the low-concentration source region 1b and the low-concentration drain region 1c by the capacitor line 300 and the data line 6a constituting the upper light-shielding film, as described above, together with the light-shielding film on the facing-substrate 20. Furthermore, the above-mentioned light-shielding film on the facing-substrate 20 serves a function of reducing or preventing a temperature increase of the electro-optical apparatus when at least the surface to be irradiated by the incident light is formed from a highly reflective film.

In the above-mentioned configuration in which the pixel electrode 9a and the counter electrode 21 are arranged facing each other, a liquid crystal, as an example of the electro-optical material, is encapsulated in a space enclosed with a sealing member, described below, between the TFT array substrate 10 and the counter substrate 20, and therefore, the liquid crystal layer 50 is formed. The liquid crystal layer 50 is brought into a predetermined alignment condition by the alignment films 16 and 22 under the condition in which the electric field from the pixel electrode 9a is not applied. The liquid crystal layer 50 is composed of, e.g., one type of liquid crystal or a liquid crystal in which plural types of nematic liquid crystal are mixed. The sealing member is an adhesive composed of, e.g., a photo-curing resin or a thermosetting resin to stick the TFT array substrate 10 and the counter substrate 20 to each other in the periphery thereof, and contains gap members, e.g., glass fibers or glass beads, in order to set the distance between the two substrates at a predetermined value.

Furthermore, a substrate insulating film 12 is provided under the TFT 30 to provide pixel switching. The substrate insulating film 12 has the function of interlayer-insulating the TFT 30 from the lower light-shielding film 11a, and in addition to this, has the function of reducing or preventing degradation of the characteristics of the TFT 30 to provide pixel switching due to roughness of the surface of the TFT array substrate 10 during polishing, stains remaining after cleaning and the like when formed all over the surface of the TFT array substrate 10.

In FIG. 3, the TFT 30 to provide pixel switching has an LDD (Lightly Doped Drain) structure, and is provided with the scanning line 3a, the channel region 1a' of the semiconductor layer 1a in which the channel is formed by an electric field of the scanning line 3a, an insulating film 2 including a gate insulating film to insulate the scanning line 3a from the semiconductor layer 1a, the low-concentration source region 1b and the low-concentration drain region 1c of the semiconductor layer 1a, and the high-concentration source region 1d and the high-concentration drain region 1e of the semiconductor layer 1a.

The first interlayer insulating film 41 is provided on the scanning line 3a, in which each of a contact hole 81 connected to the high-concentration source region 1d and a contact hole 83 connected to the high-concentration drain region 1e is provided.

The junction layer 71 and the capacitor line 300 are provided on the first interlayer insulating film 41, and the second interlayer insulating film 42 is provided thereon, in which each of the contact hole 81 and the contact hole 85 is provided.

In particular in the present exemplary embodiment, the data line 6a and the multilayer junction-layer 402 are formed on the second interlayer insulating film 42 from the same multilayer film, that is, a first layer 450 and a second layer 452, and the third interlayer insulating film 43 is provided thereon, in which the contact hole 85 connected to the junction layer 71 is provided. The pixel electrode 9a is provided on the top surface of the third interlayer insulating film 43 constructed as described above.

Figure 4:
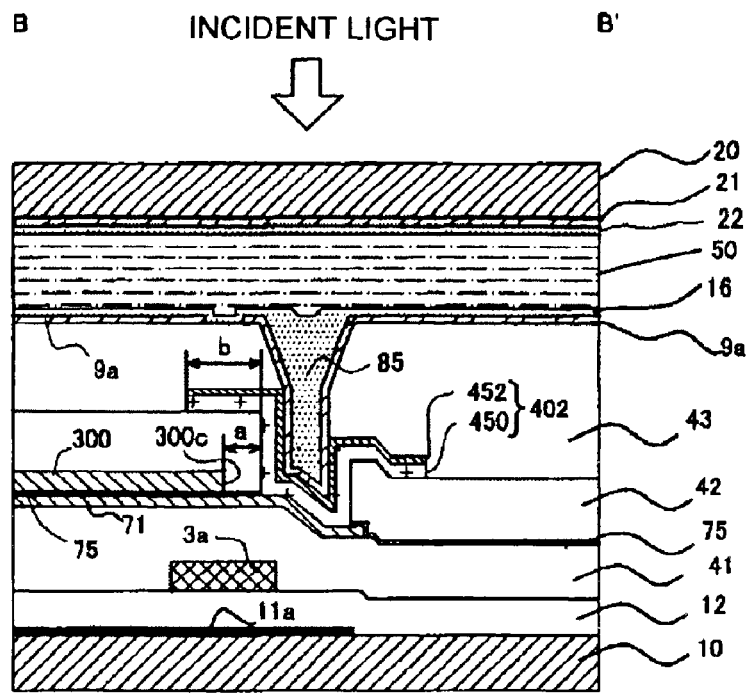
FIG. 4 is a sectional view of the section taken along plane B–B' shown in FIG. 2 according to the first exemplary embodiment.
Figure 5:
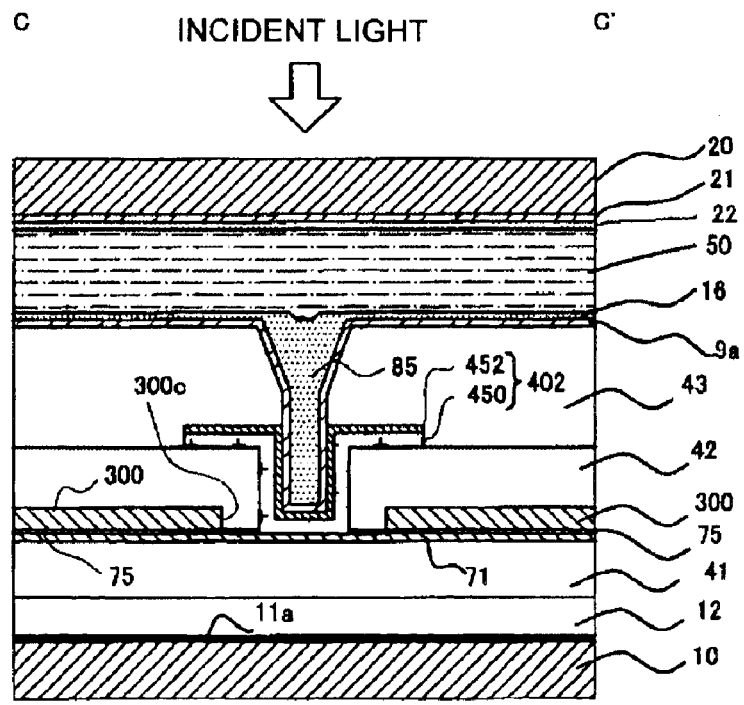
FIG. 5 is a sectional view of the section taken along plane C–C' shown in FIG. 2 according to the first exemplary embodiment.
Figure 6:
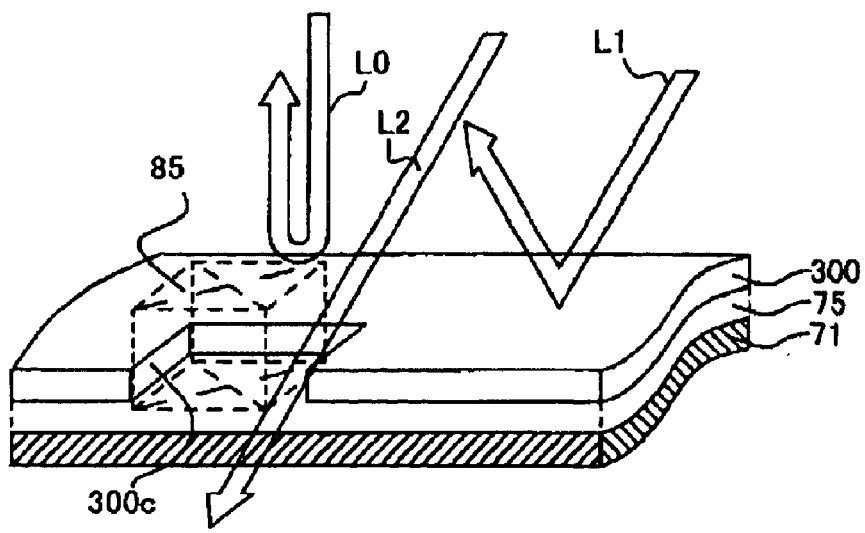
FIG. 6 is a partial perspective view schematically showing the manner of light shielding at a contact hole and the periphery thereof in a Comparative example, in which the contact hole connects a pixel-potential-side capacitor electrode to a pixel electrode.
Figure 7:
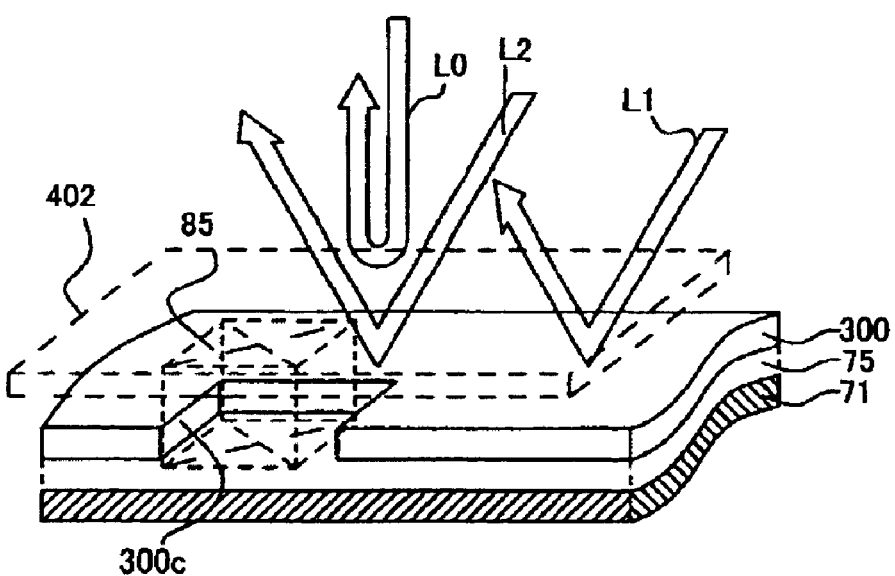
FIG. 7 is a partial perspective view schematically showing the manner of light shielding at a contact hole and the periphery thereof in the first exemplary embodiment, in which the contact hole connects a pixel-potential-side capacitor electrode to a pixel electrode.

The light-shielding function of the multilayer junction-layer 402 in the vicinity of the contact hole 85 will be described with reference to FIG. 4 to FIG. 7 and FIG. 2. FIG. 4 is a sectional view of the section taken along plane B–B' shown in FIG. 2. FIG. 5 is a sectional view of the section taken along plane C–C' shown in FIG. 2. FIG. 6 is a partial perspective view schematically showing the manner of light shielding at the contact hole 85 and the periphery thereof in a Comparative example. FIG. 7 is a partial perspective view schematically showing the manner of light shielding at the contact hole 85 and the periphery thereof in the present exemplary embodiment. In FIG. 4 and FIG. 5, the scales are varied on a layer or a member basis in order that each layer or each member has the size capable of being identified in the drawing.

In the present exemplary embodiment, "the first light-shielding film" according to the present invention corresponds to a high-melting-point metal film and the like constituting the capacitor line 300, "the first transparent film" according to the present invention corresponds to a polysilicon film and the like constituting the junction layer 71, "the second light-shielding film" according to the present invention corresponds to an Al film and the like constituting the data line 6a, and "the second transparent film" according to the present invention corresponds to an ITO film and the like constituting the pixel electrode 9a.

As shown in FIG. 4, FIG. 5 and FIG. 2, in the vicinity of the contact hole 85, a notch portion 300c is provided in the capacitor line 300 which performs the function of a light-shielding film, negotiating around the contact hole 85. Such a notch portion 300c is necessary to connect the junction layer 71, as a pixel-potential-side capacitor electrode, and the pixel electrode 9a.

Here, each of the junction layer 71 and the pixel electrode 9a is composed of a transparent film, whereas each of the capacitor line 300 and the data line 6a is composed of a light-shielding film. Consequently, leakage of light in an unopened region of each pixel can be basically prevented by the presence of the capacitor line 300 and the data line 6a. However, the notch portion 300c is provided in the capacitor line 300 composed of the light-shielding film in the connection region in the vicinity of the contact hole 85.

Therefore, in a manner similar to that in the Comparative example shown in FIG. 6, most of perpendicularly incident light L0 and most of slantingly incident light L1 can be cut off by the capacitor line 300, although under this condition, leakage of light occurs because incident light L2 which enters into the notch portion 300c passes through the notch portion 300c. As a result, the light may incident into the channel region 1a' of the TFT 30 or the regions adjacent thereto, the low-concentration source region 1b and the low concentration drain region 1c.

On the other hand, in the present exemplary embodiment, as shown in FIG. 4, FIG. 5 and FIG. 2, the rectangular multilayer junction-layer 402 having a two-dimensional shape larger than the two-dimensional shape of the notch portion 300c in every direction, that is, a size larger two-dimensional shape, is provided to cover the notch portion 300c. For example, it is recommended that the relationship between the amount b of protrusion of the multilayer junction-layer 402 (refer to FIG. 4) and the amount a of recess of the notch portion 300c satisfies b≧a, and desirably b>a. Preferably, b is specified to be larger by the amount of deviation of the alignment.

Consequently, as shown in FIG. 7, most of perpendicularly incident light L0 and most of slantingly incident light L0 can be cut off by the capacitor line 300. In addition, the incident light L2 which is about to enter into the notch portion 300c can be cut off by the multilayer junction-layer 402 in advance. As a result, it can be reduced or effectively prevented that the light is incident into the channel region 1a' of the TFT 30 or the regions adjacent thereto, the low-concentration source region 1b and the low concentration drain region 1c. Therefore, it can be reduced or effectively prevented that changes in the characteristics of the TFT 30 cause a flicker and the like.

In particular, the multilayer junction-layer 402 has the same laminated structure as that of the data line 6a. That is, the multilayer junction-layer 402 has a multilayer structure including the first layer 450 of an Al film or the like having excellent conductivity and the second layer 452 of a high-melting-point metal film or the like having good electrochemical compatibility with ITO. Consequently, the electrical conductivity required of a wiring or a junction wiring can be mostly achieved by the presence of the first layer 450. At the same time, electrolytic corrosion due to ITO can be effectively prevented by the presence of the second layer 452.

In the present exemplary embodiment, the second layer 452 has, for example, an OD value of 2.0 or more, and preferably 4.0 or more. According to this configuration, the light-shielding performance in the notch portion 300c can be enhanced to a practically sufficient level.

In addition, since the multilayer junction-layer 402 and the data line 6a may be formed from the same multilayer film, both of them can be simultaneously formed in the same step from the same film. That is, after the first layer 450 and the second layer 452 are successively formed by sputtering, CVD or the like, the data line 6a and the multilayer junction-layer 402 can be simultaneously formed by patterning once. Preferably, the second layer 452 laminated on the first layer 450 made of Al, as described above, is formed at a temperature lower than the melting temperature of Al.

However, the data line 6a is not brought into contact with the pixel electrode 9a, and therefore, may be simply formed from the first layer 450. That is, in this case, patterning of the second layer 452 is performed separately from that of the data line 6a.

In particular in the present exemplary embodiment, since the contact hole 85 penetrates both the third interlayer insulating film 43 and the second interlayer insulating film 42, the connection region to form the contact hole 85 can be made relatively small, and in accordance with this, the size of the notch portion 300c of the capacitor line 300 or the multilayer junction-layer 402 covering this can be reduced.

Modified exemplary embodiments of the present exemplary embodiment are described below with reference to FIG. 8 and FIG. 9. Each of FIG. 8 and FIG. 9 is a partial sectional view of a section of a modified exemplary embodiment, in which the section corresponds to that taken along plane B–B' shown in FIG. 2 according to the present exemplary embodiment.

Figure 8:
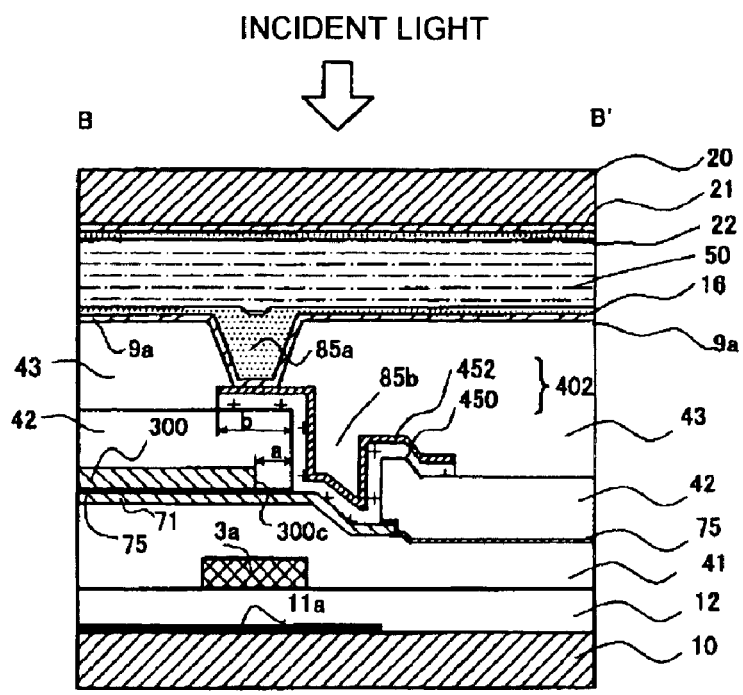
FIG. 8 is a partial sectional view of a section of an electro-optical apparatus in a modified exemplary embodiment of the first exemplary embodiment, in which the section corresponds to that taken along plane B–B' shown in FIG. 2.

As a modified exemplary embodiment of the present exemplary embodiment, a contact hole 85a from the surface of the third interlayer insulating film 43 to the multilayer junction-layer 402 on the second interlayer insulating film 42 and a contact hole 85b from the surface of the second interlayer insulating film 42 to the junction layer 71 on the first interlayer insulating film 41 may be provided in different locations on a plane, as shown in FIG. 8, in place of the above-mentioned contact hole 85. According to this configuration, electrical connection between the pixel electrode 9a and the junction layer 71 can be relatively easily performed by these two contact holes 85a and 85b, while technical difficulty in formation of the deep contact hole 85 penetrating the third interlayer insulating film 43 and the second interlayer insulating film 42 as a unit can be avoided.

Figure 9:
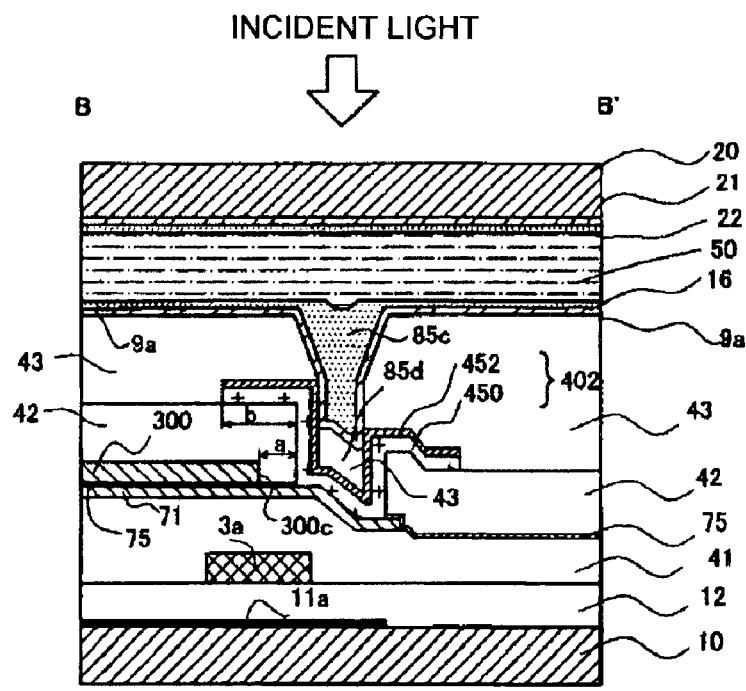
FIG. 9 is a partial sectional view of a section of an electro-optical apparatus in another modified exemplary embodiment of the first exemplary embodiment, in which the section corresponds to that taken along plane B–B' shown in FIG. 2.

Alternatively, as another modified exemplary embodiment of the present exemplary embodiment, a contact hole 85c from the surface of the third interlayer insulating film 43 to the multilayer junction-layer 402 on the second interlayer insulating film 42 and a contact hole 85d from the surface of the second interlayer insulating film 42 to the junction layer 71 on the first interlayer insulating film 41 may be provided in the same location on a plane, as shown in FIG. 9, in place of the above-mentioned contact hole 85. According to the above-mentioned exemplary embodiment, when the contact hole is deep, the multilayer junction-layer 402 may be cut by etching during the formation of the hole. On the other hand, according to the present modified exemplary embodiment, since the contact hole 85c is formed while the third interlayer insulating film 43 is slightly left in the contact hole 85d, possibility of cutting of the second layer 452 of the multilayer junction-layer by etching during the formation of the contact hole 85c can be reduced.

In the present exemplary embodiment described above, generation of a height difference in the region along the data line 6a and the scanning line 3a on the substrate surface (that is, surface of the third interlayer insulating film 43) of the pixel electrode 9a due to lamination of a plurality of conductive layers with predetermined patterns, as shown in FIG. 3, is alleviated by subjecting the surface of the third interlayer insulating film 43 to a flattening treatment. For example, the alleviation is performed through polishing by CMP (Chemical Mechanical Polishing) or the like or formation of a flat surface by using organic SOG (Spin On Glass). By alleviating the height difference between the region in which wirings, elements and the like are present and the region in which none of them is present, as described above, finally, image defects, e.g., poor alignment of the liquid crystal due to the height difference, can be reduced. However, in place of or in addition to application of the above-mentioned flattening treatment to the third interlayer insulating film 43, the flattening treatment may be performed by digging a groove in at least one of the TFT array substrate 10, the substrate insulating film 12, the first interlayer insulating film 41 and the second interlayer insulating film 42 so as to embed the data line 6a and other wirings, the TFT 30 and the like.

As described above with reference to FIG. 1 to FIG. 9, according to the electro-optical apparatus of the present exemplary embodiment, high light-shielding performance can be realized, and finally, high quality image display can be performed by the active matrix addressing system using the TFT 30 having excellent transistor characteristics while strong incident light is used.

In the exemplary embodiments described above, preferably, the TFT 30 for pixel switching has the LDD structure, as shown in FIG. 3. However, the TFT 30 may have an offset structure in which no impurity is implanted into the low-concentration source region 1b and the low-concentration drain region 1c, or the TFT 30 may be a self alignment type TFT in which impurities are implanted at a high concentration while the gate electrode composed of a part of the scanning line 3a is served as a mask, and the high-concentration source and drain regions are formed through self alignment. In the present exemplary embodiment, a single gate structure was taken on, in which simply one gate electrode of the TFT 30 to provide pixel switching was arranged between the high-concentration source region 1d and the high-concentration drain region 1e. However, at least two gate electrodes may be arranged therebetween. When the TFT is constructed with more than or equal to dual-gate or triple-gate, leakage current at the joint of the channel and the source and drain regions can be reduced or prevented, and current during turn off time can be reduced.

Second Exemplary Embodiment

Figure 10:
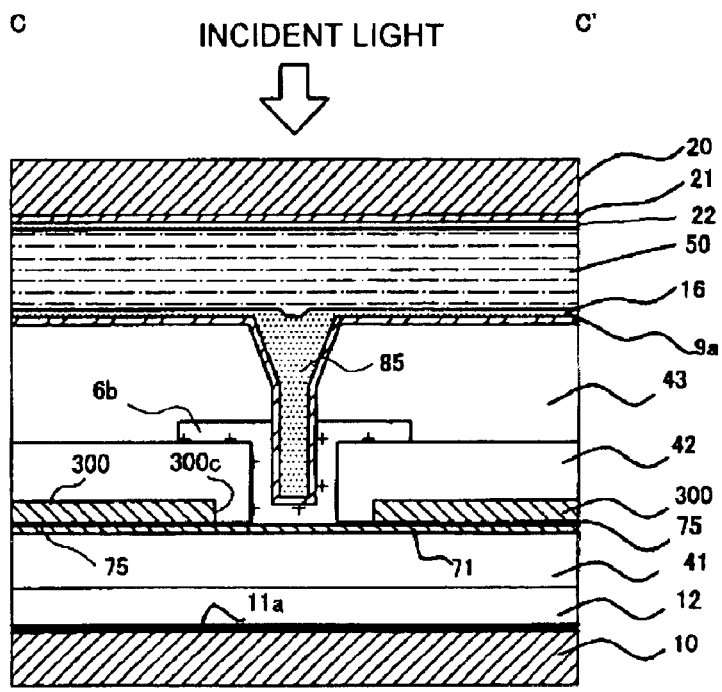
FIG. 10 is a partial sectional view of a section of an electro-optical apparatus in a second exemplary embodiment, in which the section corresponds to that taken along plane C–C' shown in FIG. 2.

An electro-optical apparatus in the second exemplary embodiment of the present invention is described below with reference to FIG. 10. FIG. 10 is a partial sectional view of a section in the second exemplary embodiment, in which the section corresponds to that taken along plane C–C' shown in FIG. 2 according to the first exemplary embodiment. In FIG. 10, the same constituents as those in the first exemplary embodiment shown in FIG. 5 are indicated by the same reference numerals and explanations thereof will be appropriately omitted.

As shown in FIG. 10, the second exemplary embodiment is configured to include a monolayer junction-layer 6b in place of the multilayer junction-layer 402 in the first exemplary embodiment. The data line is composed of the same layer as that of the monolayer junction-layer 6b. The monolayer junction-layer 6b is composed of a material having good electrochemical compatibility with ITO, for example, a simple metal, an alloy, a metal silicide or a metal nitride film, which contains at least one high-melting-point metal of Ti, Cr, W, Ta, Mo and the like in a manner similar to that in the second layer 452 in the first exemplary embodiment. Other configuration is similar to that in the above-mentioned first exemplary embodiment.

Figure 11:
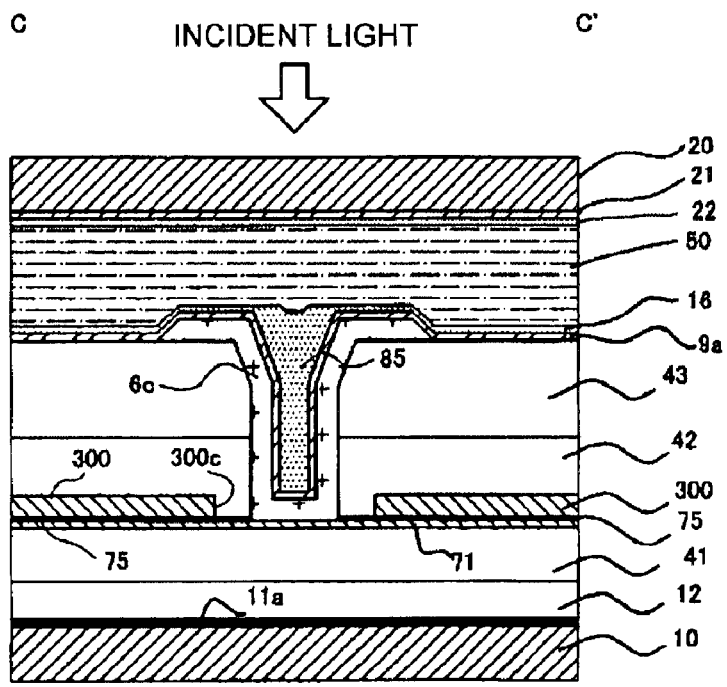
FIG. 11 is a partial sectional view of a section of an electro-optical apparatus in a modified exemplary embodiment of the second exemplary embodiment, in which the section corresponds to that shown in FIG. 10.

Consequently, according to the second exemplary embodiment, leakage of the light in the notch portion 300c can be reduced or efficiently prevented. Since the monolayer junction-layer 6b is composed of a material having good electrochemical compatibility with ITO, electrolytic corrosion in the monolayer junction-layer 6b due to ITO can be reduced or effectively prevented. In addition, both the monolayer junction-layer 6b and the data line can be simultaneously formed in the same step from the same film. Modified exemplary embodiments of the present exemplary embodiment are described with reference to FIG. 11. FIG. 11 is a partial sectional view of a section of a modified exemplary embodiment, in which the section corresponds to that shown in FIG. 10 according to the present exemplary embodiment.

As a modified exemplary embodiment of the present exemplary embodiment, the pixel electrode 9a and the junction layer 71 can also be electrically connected to each other, as shown in FIG. 11, by using the monolayer junction-layer 6c on the third interlayer insulating film 43 in place of the monolayer junction-layer 6b on the second interlayer insulating film 42. In this case as well, for example, various conductive metals, e.g., Ti, can be adopted as the material constituting the monolayer junction-layer 6c in a manner similar to that in the monolayer junction-layer 6b in the above-mentioned second exemplary embodiment. According to this configuration, when the ITO film is patterned, and the pixel electrode 9a is formed by dry etching, it can be prevented that the monolayer junction-layer 6c made of, e.g., Ti, is undercut.

Overall Configuration of Electro-optical Apparatus

Figure 12:
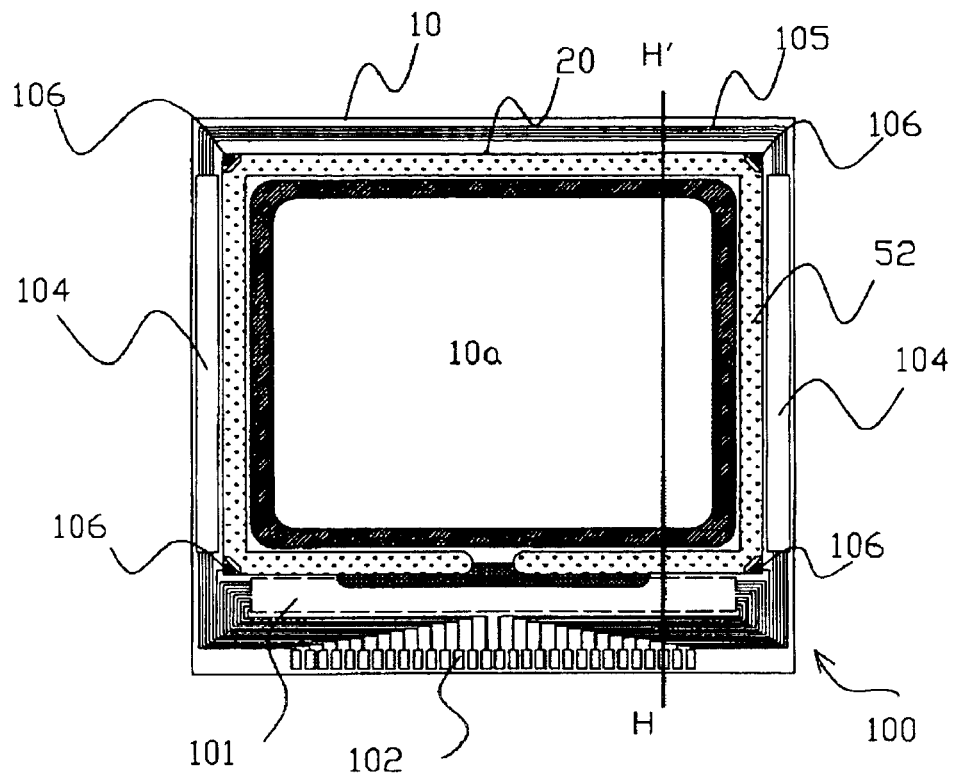
FIG. 12 is a plan view of a TFT array substrate, together with each constituent provided thereon, of an electro-optical apparatus in an exemplary embodiment, as viewed from the facing-substrate side.
Figure 13:
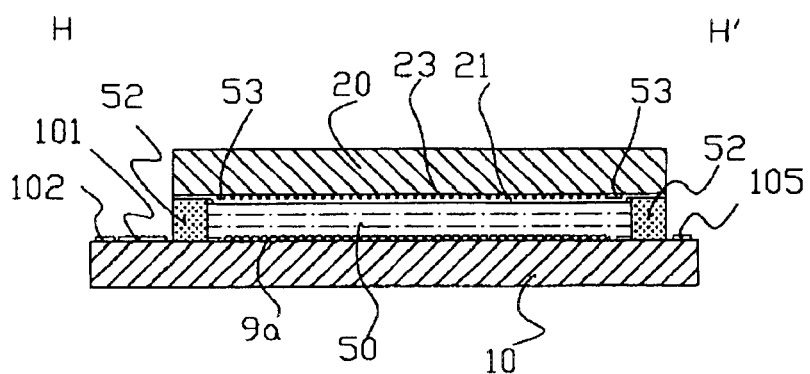
FIG. 13 is a sectional view of the section taken along plane H–H' shown in FIG. 12.

The overall configuration of the electro-optical apparatus in each exemplary embodiment constructed as described above is described below with reference to FIG. 12 and FIG. 13. FIG. 12 is a plan view of a TFT array substrate 10 together with each constituent provided thereon, viewed from the facing-substrate 20 side. FIG. 13 is a sectional view of the section taken along plane H–H' shown in FIG. 12.

In FIG. 12, a sealing member 52 is provided on the TFT array substrate 10 along the edge thereof, and the light-shielding film 53 is provided as a frame specifying the periphery of the image display region 10a in the inside of and parallel to the sealing member 52. In the region outside the sealing member 52, a data line driving circuit 101 for driving the data line 6a by supplying an image signal to the data line 6a with predetermined timing and an external circuit connection terminal 102 are provided along one side of the TFT array substrate 10, and scanning line driving circuits 104 to drive the scanning line 3a by supplying a scanning signal to the scanning line 3a with predetermined timing is provided along the two sides adjacent to this one side. When delay of the scanning signal supplied to the scanning line 3a causes no problem, the scanning line driving circuit 104 may be simply provided along one side. The data line driving circuits 101 may be arranged along both the sides of the image display region 10a. Furthermore, a plurality of wirings 105 for connecting between the scanning line driving circuits 104 provided on both the sides of the image display region 10a are provided on the remaining one side of the TFT array substrate 10. At least one of corner portions of the facing-substrate 20 is provided with a conductive member 106 for providing electrical conductivity between the TFT array substrate 10 and the facing-substrate 20. As shown in FIG. 13, the facing-substrate 20 having nearly the same contour as the sealing member 52 shown in FIG. 12 is adhered to the TFT array substrate 10 by the sealing member 52.

In addition to the data line driving circuit 101, the scanning line driving circuit 104 and the like, for example, a sampling circuit to apply an image signal to a plurality of data lines 6a with predetermined timing, a pre-charge circuit to supply a pre-charge signal at a predetermined voltage level to each of the plural data lines 6a in advance of the image signal, and an inspection circuit for inspecting the quality, defects and the like of the electro-optical apparatus during the manufacture and the shipment, may be formed on the TFT array substrate 10.

In the exemplary embodiments described above with reference to FIG. 1 to FIG. 13, for example, electrical and mechanical connection to an LSI to drive mounted on a TAB (Tape Automated bonding) substrate via an anisotropic conductive film provided in the periphery of the TFT array substrate 10 may be established in place of provision of the data line driving circuit 101 and the scanning line driving circuit 104 on the TFT array substrate 10. Furthermore, polarizing films, retardation films, polarizers and the like are arranged on each of the incident side of the projected light of the facing-substrate 20 and the outgoing side of the outgoing light of the TFT array substrate 10 in predetermined directions in accordance with, for example, action modes, e.g., a TN (Twisted Nematic) mode, a VA (Vertically Aligned) mode and a PDLC (Polymer Dispersed Liquid Crystal) mode, and normally white mode/normally black mode.

Since the electro-optical apparatuses in the above-mentioned exemplary embodiments are applied to projectors, three electro-optical apparatuses are used as respective RGB light valves, and the lights of respective colors separated through respective dichroic mirrors for color separation of RGB are incident into respective light valves as projected lights. Therefore, the facing-substrate 20 is provided with no color filter in each exemplary embodiment. However, in a predetermined region facing the pixel electrode 9a, color filters of RGB may be formed on the facing-substrate 20 together with protective films thereof. In this manner, the electro-optical apparatus in each exemplary embodiment can be applied to direct-view type and reflective color electro-optical apparatuses except for projectors. Microlenses may be formed on the facing-substrate 20 while one lens corresponds to one pixel. Alternatively, a color filter layer may be formed from a color resist or the like under the pixel electrode 9a facing RGB on the TFT array substrate 10. In this manner, the light-gathering efficiency of the incident light is enhanced, and thereby, a bright electro-optical apparatus can be realized. Dichroic filters to generate RGB colors through the use of interference of light may be formed on the facing-substrate 20 by depositing a plurality of interference layers having different refractive indices. According to the facing-substrate with this dichroic filters, a brighter color electro-optical apparatus can be realized.

(Exemplary Embodiment of electronic equipment)

Figure 14:
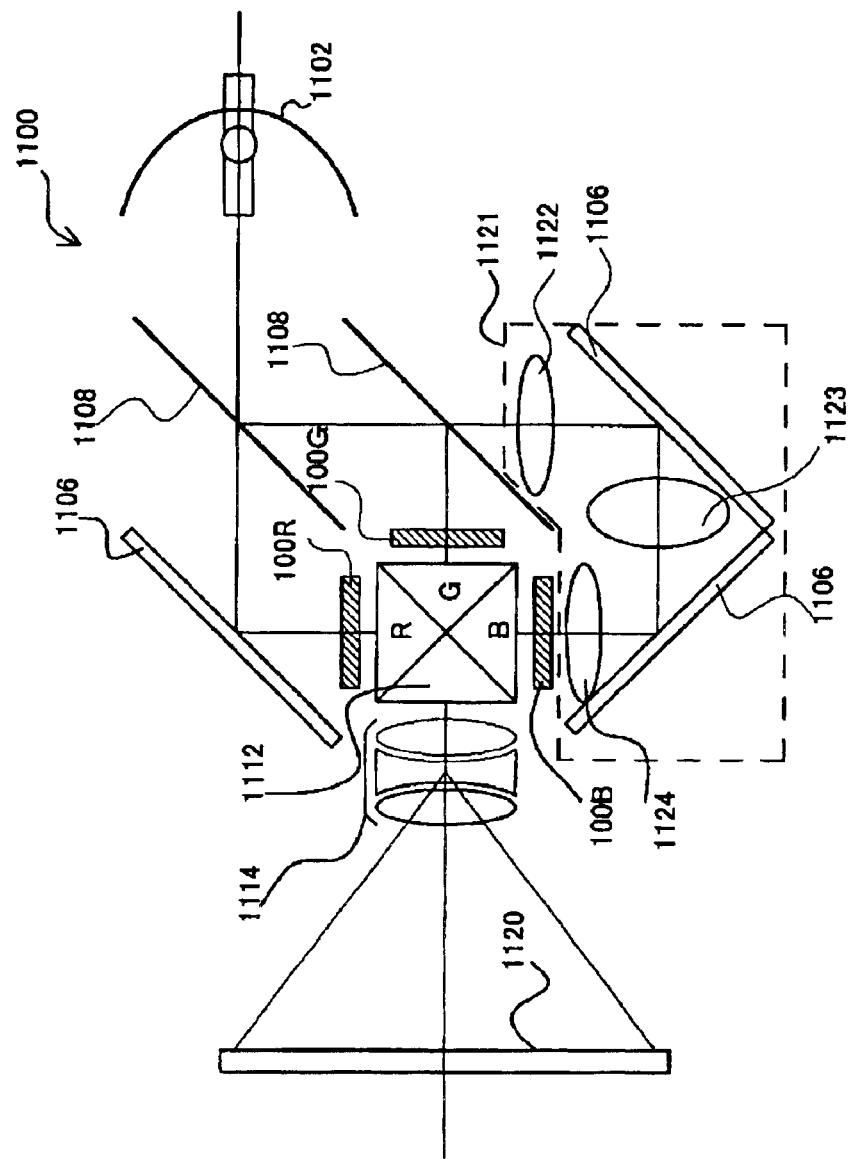
FIG. 14 is a schematic sectional view showing a color liquid crystal projector as an example of a projection color display device according to an exemplary embodiment of electronic equipment of the present invention.

The overall configuration, in particular the optical configuration, of the exemplary embodiment of a projection color display device, as an example of electronic equipment using the electro-optical apparatus described above in detail, as a light valve, is described below. FIG. 14 is a schematic sectional view of the projection color display device.

In FIG. 14, a liquid crystal projector 1100, as an example of the projection color display device in the present exemplary embodiment, is constructed as a projector in which three liquid crystal modules including a liquid crystal device 100 equipped with a driving circuit on a TFT array substrate are prepared, and are used as RGB light valves 100R, 100G and 100B respectively. In the liquid crystal projector 1100, when projected light is emitted from a lamp unit 1102 of a white light source, e.g., a metal halide lamp, the projected light is separated into light components R, G and B corresponding to three primary color RGB by three mirrors 1106 and two dichroic mirrors 1108, and the resulting light components are guided to the light valves 100R, 100G and 100B corresponding to respective colors. At this time, in particular B light is guided through a relay lens system 1121 composed of an incident lens 1122, a relay lens 1123 and an outgoing lens 1124 in order to reduce or prevent the light loss due to a long optical path. The light components corresponding to the three primary color RGB, modulated by the respective light valves 100R, 100G and 100B are synthesized again by a dichroic prism 1112, and thereafter, the resulting light is projected as a color image onto a screen 1120 through projection lenses 1114.

The present invention is not limited to the above-mentioned exemplary embodiments, and can be appropriately modified within the scope or spirit of the invention read in the claims and the whole specification. Substrate devices and electro-optical apparatuses with the above-mentioned modifications, e.g., a display panel using an EL element, are also included in the technical scope of the present invention.

What is claimed is:

1. An electro-optical apparatus, comprising:
   a substrate;
   a pixel electrode provided above the substrate;
   a thin film transistor to perform switching control of the pixel electrode;

a data line provided on an upper layer side of the thin film transistor, and which supplies an image signal to the pixel electrode via the thin film transistor;

a storage capacitor, including a pixel-potential-side capacitor electrode, provided on the upper layer side of the thin film transistor, and which is electrically connected between the thin film transistor and the pixel electrode;

a dielectric film;

a capacitor line including a fixed-potential-side capacitor electrode provided on the upper layer side of the pixel-potential-side capacitor electrode, facing the pixel-potential-side capacitor electrode with the dielectric film disposed therebetween, and which is provided with a notch portion corresponding to a connection region to connect the pixel-potential-side capacitor electrode and the pixel electrode;

the pixel-potential-side capacitor electrode including a first conductive transparent film, the capacitor line including a first conductive light-shielding film, the data line including a second conductive light-shielding film, and the pixel electrode including a second conductive transparent film; and a multilayer junction-layer transit-connected between the pixel-potential-side capacitor electrode and the pixel electrode, which has a laminated structure including a first layer including the second light-shielding film and a conductive second layer having a chemical stability against the second transparent film higher than a chemical stability of the second light-shielding film, laminated on the upper layer side of the first layer, and which is planar covering the notch portion in plan view and is further provided in the connection region.

2. The electro-optical apparatus according to claim 1, the multilayer junction-layer being larger than the notch portion in plan view.

3. The electro-optical apparatus according to claim 1, the data line having the same laminated structure as the multilayer junction-layer.

4. The electro-optical apparatus according to claim 1, further including:

a first interlayer insulating film laminated between the thin film transistor and the first transparent film;

a second interlayer insulating film laminated between the first light-shielding film and the second light-shielding film; and a third interlayer insulating film laminated between the second light-shielding film and the second transparent film;

the thin film transistor and the pixel-potential-side capacitor electrode being electrically connected via a first contact hole provided in the first insulation film;

the pixel-potential-side capacitor electrode and the multilayer junction-layer being electrically connected via a second contact hole provided in the second interlayer insulating film; and the multilayer junction-layer and the pixel electrode being electrically connected via a third contact hole provided in the third interlayer insulating film.

5. The electro-optical apparatus according to claim 4, the third contact hole being provided extending in the second contact hole, and the first transparent film, the multilayer junction-layer and the second transparent film being directly laminated in the second contact hole.

6. The electro-optical apparatus according to claim 5, the second contact hole and the third contact hole being coaxially provided.

7. The electro-optical apparatus according to claim 1, the second transparent film including ITO (Indium Tin Oxide), the first layer including Al (aluminum), and the second layer including a simple metal, an alloy or a metal silicide, or a metal nitride film, which contains a high-melting-point metal.

8. The electro-optical apparatus according to claim 1, the second layer having an OD (Optical Density) value of 2.0 or more.

9. The electro-optical apparatus according to claim 1, further including:

a facing-substrate facing the substrate; and an electro-optical material layer held between the substrate and the facing-substrate.

10. An electro-optical apparatus, comprising:

a substrate;

a pixel electrode provided above the substrate;

a thin film transistor to perform switching control of the pixel electrode;

a data line provided on an upper layer side of the thin film transistor, and which supplies an image signal to the pixel electrode via the thin film transistor;

a storage capacitor, including a pixel-potential-side capacitor electrode, provided on the upper layer side of the thin film transistor, and which is electrically connected between the thin film transistor and the pixel electrode;

a dielectric film;

a capacitor line including a fixed-potential-side capacitor electrode provided on the upper layer side of the pixel-potential-side capacitor electrode, facing the pixel-potential-side capacitor electrode with the dielectric film therebetween, and which is provided with a notch portion corresponding to a connection region to connect the pixel-potential-side capacitor electrode and the pixel electrode;

the pixel-potential-side capacitor electrode including a first conductive transparent film, the capacitor line including a first conductive light-shielding film, the data line including a second conductive light-shielding film, the pixel electrode including a second conductive transparent film; and a monolayer junction-layer transit-connected between the pixel-potential-side capacitor electrode and the pixel electrode, which includes the second light-shielding film, and which is planar covering the notch portion in plan view and is further provided in the connection region.

11. The electro-optical apparatus according to claim 10, the second transparent film including ITO, and the second light-shielding film including a simple metal, an alloy or a metal silicide, or a metal nitride film, which contains a high-melting-point metal.

12. The electro-optical apparatus according to claim 10, further including:

a facing-substrate facing the substrate; and an electro-optical material layer held between the substrate and the facing-substrate.

13. An electronic equipment, comprising:
an electro-optical apparatus that includes:
- a substrate;
- a pixel electrode provided above the substrate;
- a thin film transistor to perform switching control of the pixel electrode;
- a data line provided on an upper layer side of the thin film transistor, and which supplies an image signal to the pixel electrode via the thin film transistor;
- a storage capacitor including a pixel-potential-side capacitor electrode, provided on the upper layer side of the thin film transistor, and which is electrically connected between the thin film transistor and the pixel electrode;
- a dielectric film;
- a capacitor line including a fixed-potential-side capacitor electrode provided on the upper layer side of the pixel-potential-side capacitor electrode, facing the pixel-potential-side capacitor electrode with the dielectric film disposed therebetween, and which is provided with a notch portion corresponding to a connection region to connect the pixel-potential-side capacitor electrode and the pixel electrode;
- the pixel-potential-side capacitor electrode including a first conductive transparent film, the capacitor line including a first conductive light-shielding film, the data line including a second conductive light-shielding film, the pixel electrode including a second conductive transparent film; and a multilayer junction-layer transit-connected between the pixel-potential-side capacitor electrode and the pixel electrode, which has a laminated structure including a first layer including the second light-shielding film and a conductive second layer having chemical stability against the second transparent film higher than a chemical stability of the second light-shielding film, laminated on the upper layer side of the first layer, and which is planar covering the notch portion in plan view and is further provided in the connection region.

14. An electronic equipment, comprising:
an electro-optical apparatus that includes:
- a substrate;
- a pixel electrode provided above the substrate;
- a thin film transistor to perform switching control of the pixel electrode;
- a data line provided on an upper layer side of the thin film transistor, and which supplies an image signal to the pixel electrode via the thin film transistor;
- a storage capacitor, including a pixel-potential-side capacitor electrode, which is provided on the upper layer side of the thin film transistor, and which is electrically connected between the thin film transistor and the pixel electrode;
- a dielectric film;
- a capacitor line including a fixed-potential-side capacitor electrode provided on the upper layer side of the pixel-potential-side capacitor electrode, facing the pixel-potential-side capacitor electrode with the dielectric film therebetween, and which is provided with a notch portion corresponding to a connection region to connect the pixel-potential-side capacitor electrode and the pixel electrode;
- the pixel-potential-side capacitor electrode including a first conductive transparent film, the capacitor line including a first conductive light-shielding film, the data line including a second conductive light-shielding film, the pixel electrode including a second conductive transparent film; and
- a monolayer junction-layer transit-connected between the pixel-potential-side capacitor electrode and the pixel electrode, which includes the second light-shielding film, and which is planar covering the notch portion in plan view and is further provided in the connection region.

15. An electro-optical apparatus, comprising:
a substrate;
a pixel electrode provided above the substrate;
a thin film transistor to perform switching control of the pixel electrode;
a data line provided on an upper layer side of the thin film transistor; and which supplies an image signal to the pixel electrode via the thin film transistor;
a pixel-potential-side capacitor electrode which is provided with a notch portion corresponding to a connection region to connect the pixel-potential-side capacitor electrode and the pixel electrode, facing the pixel-potential-side capacitor electrode with a dielectric film disposed therebetween, provided on the upper layer side of the thin film transistor, and which is electrically connected between the thin film transistor and the pixel electrode; and
a junction-layer connected between the pixel-potential-side capacitor electrode and the pixel electrode, which includes a light shielding film, and which is planar covering the notch portion in plan view and is further provided in the connection region.

* * * * *